US012591256B2

(12) United States Patent
Yamashita et al.

(10) Patent No.: US 12,591,256 B2
(45) Date of Patent: Mar. 31, 2026

(54) WORK UNIT REPLACEMENT SYSTEM AND WORK UNIT REPLACEMENT STATION

(71) Applicant: Fuyo jitsugyo Co., Ltd., Yamanashi (JP)

(72) Inventors: Saichiro Yamashita, Yamanashi (JP); Yasushi Miyashita, Yamanashi (JP)

(73) Assignee: FUYO JITSUGYO CO., LTD., Yamanashi (JP)

( * ) Notice: Subject to any disclaimer, the term of this patent is extended or adjusted under 35 U.S.C. 154(b) by 82 days.

(21) Appl. No.: 18/548,101

(22) PCT Filed: Aug. 12, 2021

(86) PCT No.: PCT/JP2021/029771
§ 371 (c)(1),
(2) Date: Aug. 28, 2023

(87) PCT Pub. No.: WO2022/208923
PCT Pub. Date: Oct. 6, 2022

(65) Prior Publication Data
US 2024/0142999 A1 May 2, 2024

(30) Foreign Application Priority Data
Mar. 29, 2021 (JP) ................................. 2021-056154

(51) Int. Cl.
G05D 1/69 (2024.01)
(52) U.S. Cl.
CPC ...................................... G05D 1/69 (2024.01)
(58) Field of Classification Search
None
See application file for complete search history.

(56) References Cited

U.S. PATENT DOCUMENTS

| | | | |
|---|---|---|---|
| 4,664,590 A | 5/1987 | Maekawa | |
| 6,253,117 B1 | 6/2001 | Soraoka et al. | |
| 10,549,915 B1 * | 2/2020 | Theobald | B65G 1/1375 |
| 2013/0054005 A1 * | 2/2013 | Stevens | G06Q 10/087 |
| | | | 700/216 |

(Continued)

FOREIGN PATENT DOCUMENTS

| | | |
|---|---|---|
| CN | 206231240 U | 6/2017 |
| CN | 107226311 A | 10/2017 |

(Continued)

OTHER PUBLICATIONS

English Machine Translation of CN109987366A, accessed Aug. 11, 2025.*

*Primary Examiner* — Jason Holloway
*Assistant Examiner* — Blake A Wood
(74) *Attorney, Agent, or Firm* — HAUPTMAN HAM, LLP

(57) ABSTRACT

The present invention easily and quickly replaces a work unit for an automated guided vehicle. A work unit replacement system includes an automated guided vehicle and a work unit replacement station. This work unit replacement station includes: a first work unit fixing portion; a second work unit fixing portion; a first support portion that partially supports the first work unit fixing portion; a second support portion that partially supports the second work unit fixing portion; and a supporting portion that separately supports the first support portion and the second support portion in a vertically movable manner.

6 Claims, 12 Drawing Sheets

(56) References Cited

U.S. PATENT DOCUMENTS

| | | | | |
|---|---|---|---|---|
| 2015/0316925 | A1 | 11/2015 | Frisk | |
| 2018/0186582 | A1* | 7/2018 | Borders | B65G 65/00 |
| 2018/0312349 | A1* | 11/2018 | Morfino | B65G 1/0407 |
| 2019/0062057 | A1* | 2/2019 | Cantor | G05D 1/0297 |
| 2019/0064845 | A1* | 2/2019 | Pardasani | G05D 1/0282 |
| 2019/0248007 | A1* | 8/2019 | Duffy | B25J 9/1653 |
| 2021/0316412 | A1* | 10/2021 | Geissler | B66F 9/07513 |
| 2021/0362341 | A1* | 11/2021 | Cote | B25J 19/0045 |
| 2022/0410399 | A1 | 12/2022 | Yoshikuwa et al. | |

FOREIGN PATENT DOCUMENTS

| | | | | | |
|---|---|---|---|---|---|
| CN | 109987366 | A | * | 7/2019 | B65G 1/0492 |
| DE | 202016105302 | U1 | | 1/2018 | |
| EP | 3395497 | A1 | | 10/2018 | |
| JP | S60-242941 | A | | 12/1985 | |
| JP | H05221516 | A | | 8/1993 | |
| JP | H09-036198 | A | | 2/1997 | |
| JP | 2018-513817 | A | | 5/2018 | |
| JP | 2019091770 | A | | 6/2019 | |
| JP | 2021-084178 | A | | 6/2021 | |
| KR | 1020140019529 | A | | 2/2014 | |
| WO | 2016130338 | A1 | | 8/2016 | |

* cited by examiner

FIG. 2

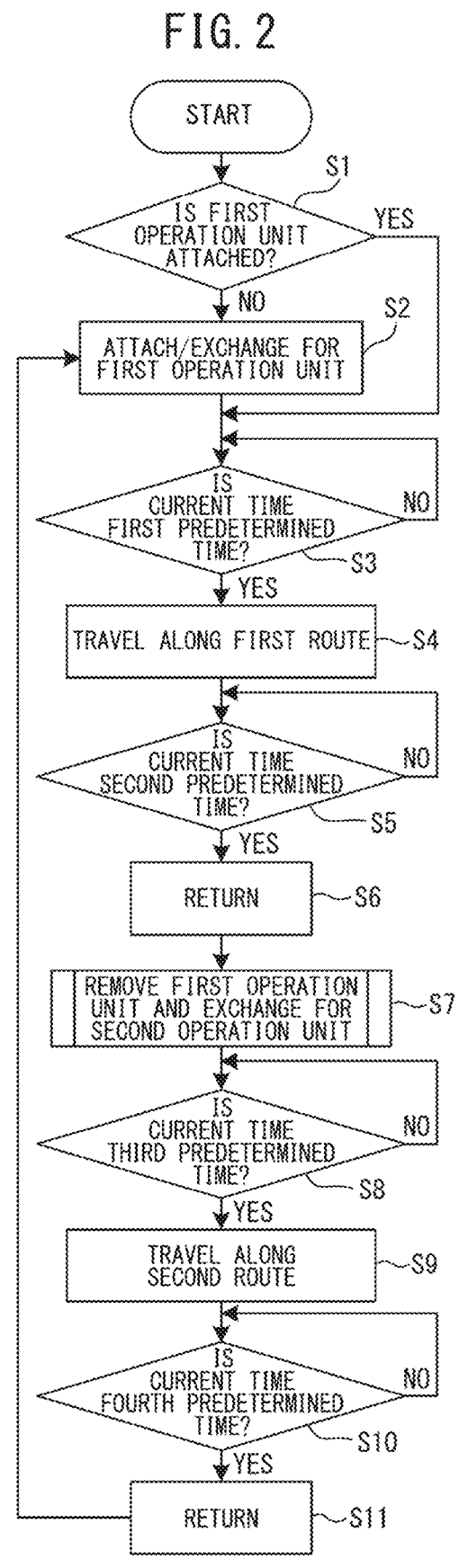

START

S1 — IS FIRST OPERATION UNIT ATTACHED? — YES

NO

S2 — ATTACH/EXCHANGE FOR FIRST OPERATION UNIT

S3 — IS CURRENT TIME FIRST PREDETERMINED TIME? — NO

YES

S4 — TRAVEL ALONG FIRST ROUTE

S5 — IS CURRENT TIME SECOND PREDETERMINED TIME? — NO

YES

S6 — RETURN

S7 — REMOVE FIRST OPERATION UNIT AND EXCHANGE FOR SECOND OPERATION UNIT

S8 — IS CURRENT TIME THIRD PREDETERMINED TIME? — NO

YES

S9 — TRAVEL ALONG SECOND ROUTE

S10 — IS CURRENT TIME FOURTH PREDETERMINED TIME? — NO

YES

S11 — RETURN

FIG. 7

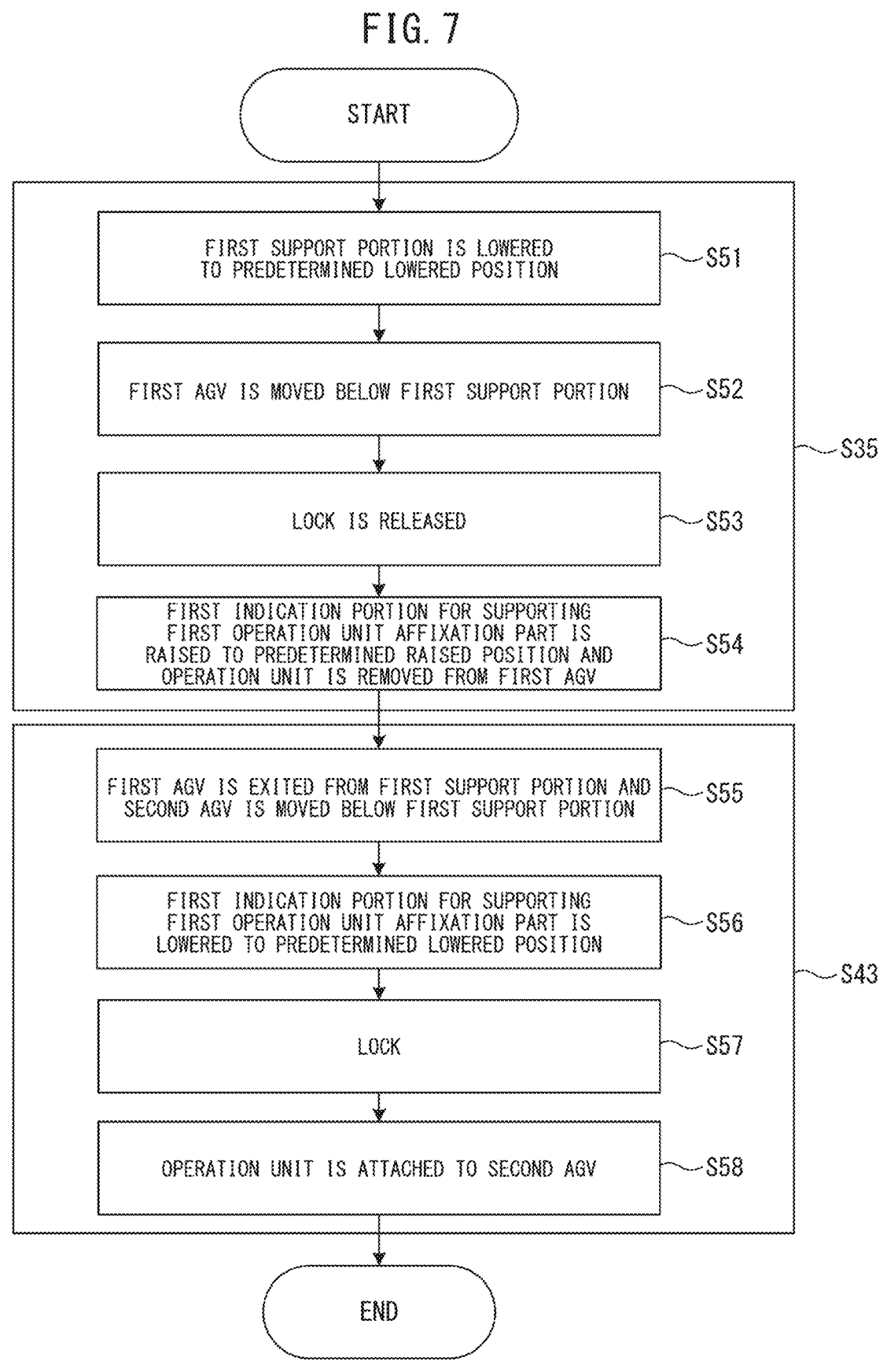

START

FIRST SUPPORT PORTION IS LOWERED TO PREDETERMINED LOWERED POSITION — S51

FIRST AGV IS MOVED BELOW FIRST SUPPORT PORTION — S52

LOCK IS RELEASED — S53

FIRST INDICATION PORTION FOR SUPPORTING FIRST OPERATION UNIT AFFIXATION PART IS RAISED TO PREDETERMINED RAISED POSITION AND OPERATION UNIT IS REMOVED FROM FIRST AGV — S54

— S35

FIRST AGV IS EXITED FROM FIRST SUPPORT PORTION AND SECOND AGV IS MOVED BELOW FIRST SUPPORT PORTION — S55

FIRST INDICATION PORTION FOR SUPPORTING FIRST OPERATION UNIT AFFIXATION PART IS LOWERED TO PREDETERMINED LOWERED POSITION — S56

LOCK — S57

OPERATION UNIT IS ATTACHED TO SECOND AGV — S58

— S43

END

WORK UNIT REPLACEMENT SYSTEM AND WORK UNIT REPLACEMENT STATION

RELATED APPLICATIONS

The present application is a National Phase of International Application No. PCT/JP2021/029771 filed Aug. 12, 2021, which claims priority to Japanese Application No. 2021-056154, filed Mar. 29, 2021.

FIELD

The present invention relates to an operation unit exchange system and an operation unit exchange station. In particular, the present invention relates to an operation unit exchange system and operation unit exchange station for exchanging an operation unit installed on an automatic guided vehicle (AGV) with another operation unit.

BACKGROUND

Automatic guided vehicles, which are used in factories for transporting components, are expected to be used in other industries except for manufacturing field as a result of the development of AI and machine learning (Japanese Unexamined Patent Publication (Kokai) No. 09-036198).

In other industries, such as hospitals, automatic guided vehicles are highly desired because they can solve the problem of labor shortages, present no hygiene problems, and can be operated for long periods of time.

CITATION LIST

Patent Literature

[PTL 1] Japanese Unexamined Patent Publication (Kokai) No. 09-036198

SUMMARY

Technical Problem

Conventionally, automatic guided vehicles are integrally constructed with a single-function operation unit. However, other industries require automatic guided vehicles so as to perform a plurality of different tasks. For example, in a hospital, different tasks during the day and at night may be required for an automatic guided vehicle.

The purchaser of an automatic guided vehicle cannot usually change the function of the automatic guided vehicle. Thus, when requesting a plurality of tasks for an automatic guided vehicle, it is necessary to prepare a plurality of automatic guided vehicles each of which has a operation unit suitable for each task. However, it is difficult to purchase the plurality of expensive automatic guided vehicles, and space is required to store the plurality of automatic guided vehicles.

Alternatively, the purchaser can request the manufacturer to exchange an operation unit suitable for a certain job with another operation unit suitable for another job. In this case, complicated procedures are required, and it is difficult to quickly exchange the operation unit for another operation unit.

Thus, an operation unit exchange system and an operation unit exchange station which can easily and quickly exchange the operation units of an automatic guided vehicle are desired.

Solution to Problem

According to a first aspect of the present disclosure, there is provided an operation unit exchange system, comprising an automatic guided vehicle, and an operation unit exchange station, wherein the operation unit exchange station comprises a first operation unit affixation part to which a first operation unit is affixed, a second operation unit affixation part to which a second operation unit is affixed, a first support portion which partially supports the first operation unit affixation part, a second support portion which partially supports the second operation unit affixation part, and a support part which supports the first support portion and the second support portion so as to be capable of individually raising and lowering them, a slit is formed in each of the first support portion and the second support portion, widths of the slits are less than widths of the first operation unit affixation part and the second operation unit affixation part, the widths of the slits are greater than a width of the automatic guided vehicle, and a lower surface position of the support part is higher than a top part of the automatic guide vehicle.

Advantageous Effects of Invention

In the first aspect, in a state in which the automatic guided vehicle is below the support part, while lowering one of the support portions, one operation unit affixation part is placed on a top part of the automatic guided vehicle. While raising one support portion, one operation unit affixation part engages with the one support portion and rises together therewith. By such an operation, the operation units of the automatic guided vehicle can easily and quickly be exchanged. The object, characteristics, and advantages of the present invention will be further clarified by means of the following descriptions of the embodiments in association with the attached drawings.

BRIEF DESCRIPTION OF DRAWINGS

FIG. 2 is a flowchart detailing the operation of the operation unit exchange system shown in FIG. 1.

FIG. 7 is a flowchart detailing an exchange operation of automatic guided vehicles.

DESCRIPTION OF EMBODIMENTS

Figure 1:
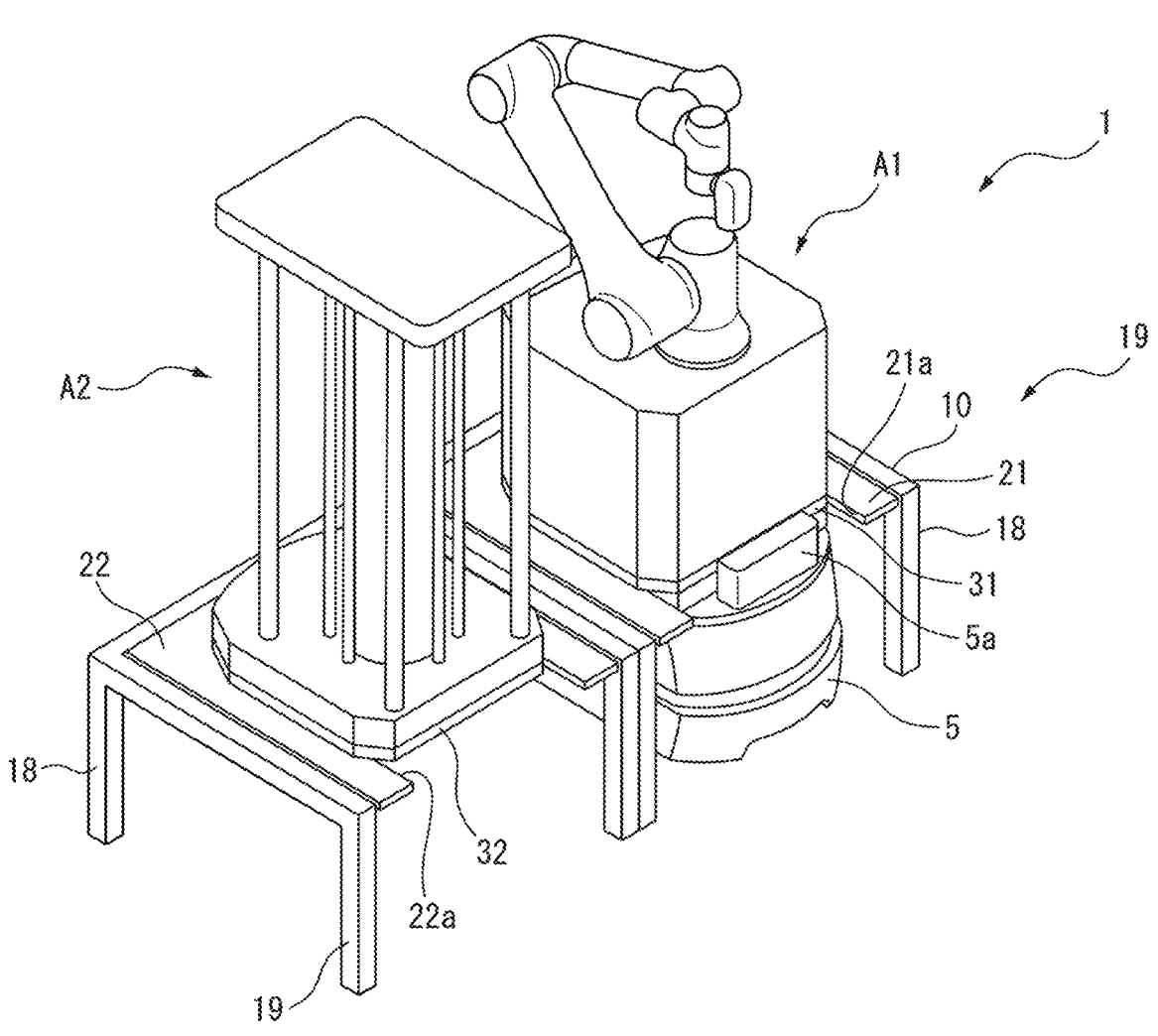
FIG. 1 is a perspective view of an operation unit exchange system based on a first embodiment.

The embodiments of the present invention will be described below with reference to the attached drawings. In the drawings, corresponding constituent elements have been assigned common reference signs.

FIG. 1 is a perspective view of an operation unit exchange system based on a first embodiment. As shown in FIG. 1, an operation unit exchange system 1 mainly comprises an automatic guided vehicle (AGV) 5, and an operation unit exchange station 19 for exchanging operation units A1, A2.

The operation unit A1 and the operation unit A2 are preferably devices having different functions. In the embodiment shown in FIG. 1, the operation unit A1 is a collaborative robot which cooperates with a human to perform a predetermined work, and the operation unit A2 is an ultraviolet irradiation device which emits ultraviolet rays for the purpose of sterilization.

The operation units A1, A2 are not limited to the illustrated forms. For example, when the operation unit exchange system 1 is used in a hospital, the operation units A1, A2 may be a collection box for collecting used clothing, such as lab coats, unmanned vending machines which sell beverages, confectionery, and daily necessities, storage boxes for storing medicine or surgical tools, or a display comprising a touch panel or buttons for performing predetermined reception work or conversations with a doctor. As a matter of course, operation units A1, A2 having other functions can be used when the operation unit exchange system 1 is used in another location, for example, in a shopping center.

The lower surfaces of the operation units A1, A2 are affixed to a first operation unit affixation part 31 and a second operation unit affixation part 32, respectively, which are, for example, metal plates. Alternatively, the lower surfaces of the operation units A1, A2 may be directly used as the first operation unit affixation part 31 and the second operation unit affixation part 32 when the dimensions which are described later are satisfied. The top part of the automatic guided vehicle 5 has a locking mechanism (not illustrated) for each of the first operation unit affixation part 31 and the second operation unit affixation part 32. One of the first operation unit affixation part 31 and the second operation unit affixation part 32 is fastened to the automatic guided vehicle 5 by means of the locking mechanism. The locking mechanism may be, for example, a vacuum suction jig. Alternatively, when the first operation unit affixation part 31 and the second operation unit affixation part 32 are metal plates, the locking mechanism may be an electromagnet.

The automatic guided vehicle 5 is a known guided vehicle controlled by a computer provided therein. The transport route of the automatic guided vehicle 5 may be pre-stored in the memory of the computer, or may be manually input/changed via a control panel 5a provided in the automatic guided vehicle 5. The automatic guided vehicle 5 comprises a collision avoidance device, by means of which the computer of the automatic guided vehicle 5 may determine the transport route via learning.

The operation unit exchange station 19 comprises a support part 10 which supports a first support portion 21 and a second support portion 22 so as to be capable of individually raising and lowering them. The support part 10 is a frame-like shelf board with a plurality of leg parts 18. The height of the leg part 18 is set so as to be greater than the height of the automatic guided vehicle 5. The distance between two adjacent leg parts 18 is great enough for the automatic guided vehicle 5 to travel therebetween. Thus, the automatic guided vehicle 5 can freely travel below the support part 10 without colliding with the leg parts 18.

The first support portion 21 and the second support portion 22 are arranged side-by-side at locations corresponding to the top plate of the support part 10. The first support portion 21 and the second support portion 22 can engage the first operation unit affixation part 31 and the second operation unit affixation part 32, respectively.

Figure 4A:
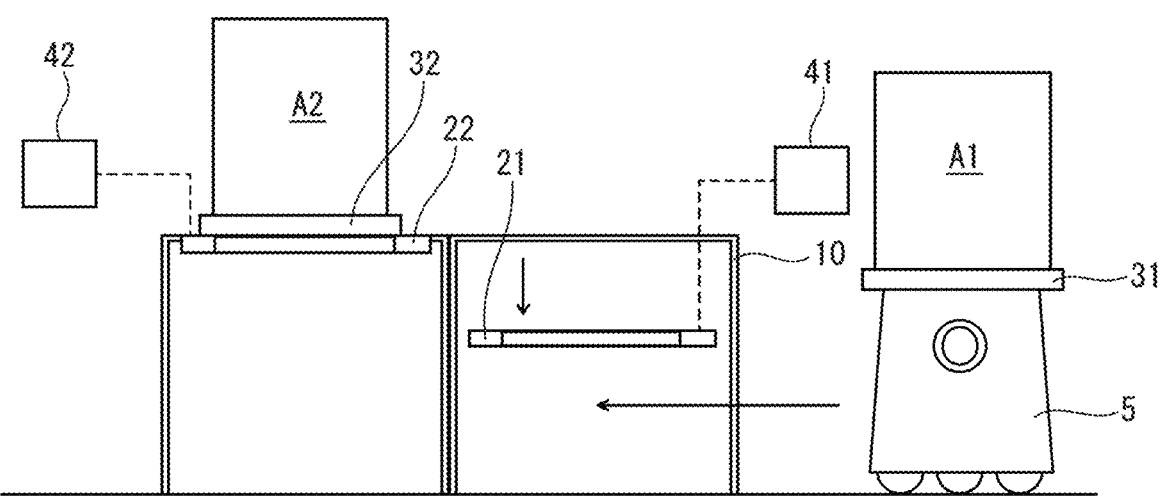
FIG. 4A is a first view detailing the exchange operation of FIG. 3.
Figure 4B:
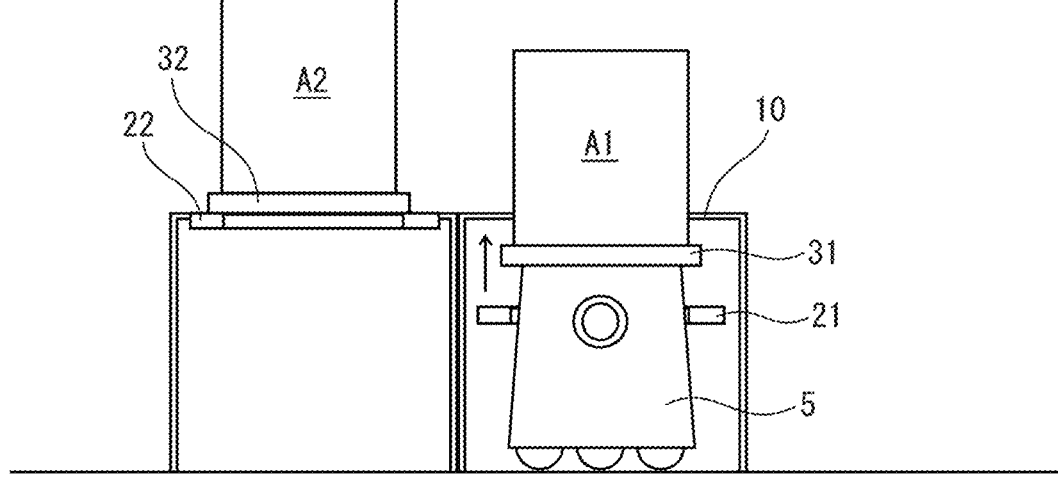
FIG. 4B is a second view detailing the exchange operation of FIG. 3.
Figure 4C:
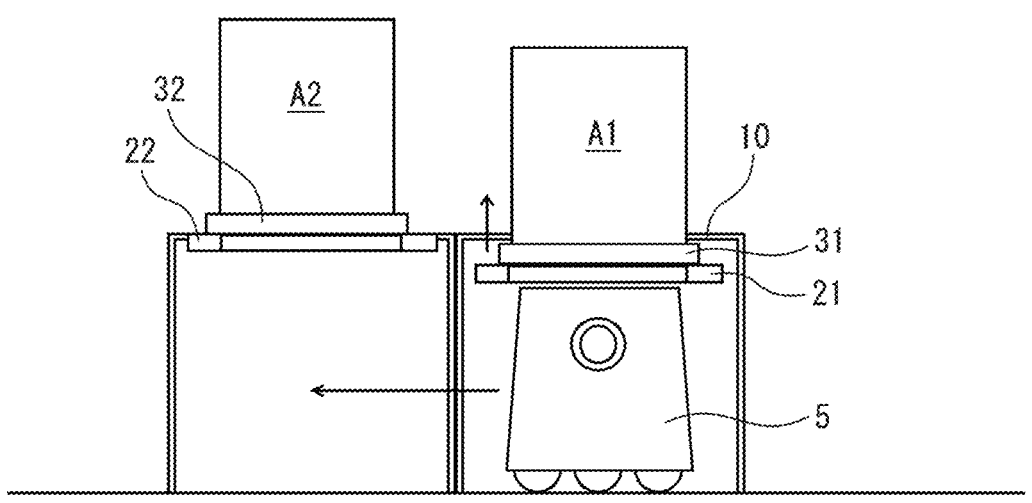
FIG. 4C is a third view detailing the exchange operation of FIG. 3.

Furthermore, as shown in FIG. 4A, which will be described later, the first support portion 21 and the second support portion 22 are connected to a first elevator 41 and a second elevator 42, respectively. Since the first elevator 41 and the second elevator 42 are publicly known, descriptions thereof have been omitted. Specifically, the first support portion 21 and the second support portion 22 are supported by the support part 10 so as to be liftable between a predetermined raised position and a predetermined lowered position. FIG. 1 shows the first support portion 21 and the second support portion 22 positioned in the predetermined raised position. The predetermined lowered position is the position between the predetermined raised position and the floor.

As can be understood from FIG. 1, slits 21a and 22a are formed in the first support portion 21 and the second support portion 22 on the front side of the support part 10. The respective widths of the slits 21a, 22a in the side-by-side direction of the first support portion 21 and the second support portion 22 are less than the widths of the first operation unit affixation part 31 and the second operation unit affixation part 32. Thus, as shown in FIG. 1, the first operation unit affixation part 31 and the second operation unit affixation part 32 are placed on the first support portion 21 and the second support portion 22, respectively, so that the first operation unit affixation part 31 and the second operation unit affixation part 32 do not fall from the slits 21a and 22a. In other words, the first support portion 21 and the second support portion 22 partially support the first operation unit affixation part 31 and the second operation unit affixation part 32, respectively.

Further, the width of each of the slits 21a, 22a in the side-by-side direction of the first support portion 21 and the second support portion 22 is greater than the width of the top part of the automatic guided vehicle 5. Thus, when the first support portion 21 or the second support portion 22 is lowered by the first elevator 41 or the second elevator 42, the entire top part of the automatic guided vehicle 5 is brought into contact with the first operation unit affixation part 31 or the second operation unit affixation part 32.

FIG. 2 is a flowchart detailing the operation of the operation unit exchange system shown in FIG. 1. The contents of FIG. 2 and the route of the automatic guided vehicle 5 are stored in the memory of the computer provided in the automatic guided vehicle 5. The automatic guided vehicle 5 is at an initial position corresponding to the position below the first support portion 21 before step S1 of FIG. 2 begins.

First, in step S1, it is determined whether or not the operation unit A1 is attached to the top part of the automatic guided vehicle 5 via the first operation unit affixation part 31, and when it is not attached, the operation unit A1 is attached to the top part of the automatic guided vehicle 5 in step S2. If it is determined that the operation unit A2 is attached to the top part of the automatic guided vehicle 5, the operation unit A2 is exchanged with the operation unit A1 in step S2. The exchange/installation of the operation units will be described later.

Then, in step S3, it is determined whether or not the current time is a first predetermined time. When the current time is the first predetermined time, the process proceeds to step S4, where the automatic guided vehicle 5, in a state in which the operation unit A1 is attached thereto, departs from the support part 10 and travels along a predetermined first route. For example, when the operation unit A1 is a collaborative robot, the automatic guided vehicle 5 travels to a predetermined location where the collaborative robot is activated and performs a predetermined task in cooperation with a worker.

Then, in step S5, it is determined whether or not the current time is a second predetermined time after the first predetermined time. When the current time is the second predetermined time, the process proceeds to step S6, where the automatic guided vehicle 5 returns to the operation unit exchange station 19. In step S7, the operation unit A1 attached to the automatic guided vehicle 5 is exchanged with the other operation unit A2, as will be described later.

Then, in step S8 it is determined whether the current time is a third predetermined time after the second predetermined time. When the current time is the third predetermined time, the process proceeds to step S9, where the automatic guided vehicle 5, in a state in which the second operation unit A2 is attached thereto, departs from the support part 10 and travels along a predetermined second route. For example, when the operation unit A2 is an ultraviolet irradiation device, the automatic guided vehicle 5 travels along the second route to another predetermined location where the ultraviolet irradiation device is activated to irradiate ultraviolet rays. Alternatively, the ultraviolet irradiation device may be activated when the automatic guided vehicle 5 departs from the support part 10. Furthermore, the second route may be the same as the first route.

Then, in step S10, it is determined whether or not the current time is a fourth predetermined time after the third predetermined time. When the current time is the fourth predetermined time, the process proceeds to step S11, where the automatic guided vehicle 5 returns to the operation unit exchange station 19. Thereafter, returning to step S2, the operation unit A2 attached to the automatic guided vehicle 5 is exchanged with the operation unit A1, as will be described later.

In this manner, in the present disclosure, the operation unit to be attached to the automatic guided vehicle 5 is automatically and periodically exchanged between the operation unit A1 and the operation unit A2. Thus, for example, during the daytime, a collaborative robot (operation unit A1) is attached to the automatic guided vehicle 5 and performs a predetermined work together with the worker, and at night, when the worker exits, an ultraviolet irradiation device (operation unit A2) can be attached to the automatic guided vehicle 5 to carry out disinfection operations.

Furthermore, the operation unit exchange station 19 may include a charging unit (not illustrated) for the purpose of operating the automatic guided vehicle 5 for long periods of time. The charging unit is automatically used when the automatic guided vehicle 5 returns to the operation unit exchange station 19 to charge the battery (not illustrated) of the automatic guided vehicle 5. Alternatively, the automatic guided vehicle 5 may return to the operation unit exchange station 19 only for the purpose of charging the battery.

Figure 3:
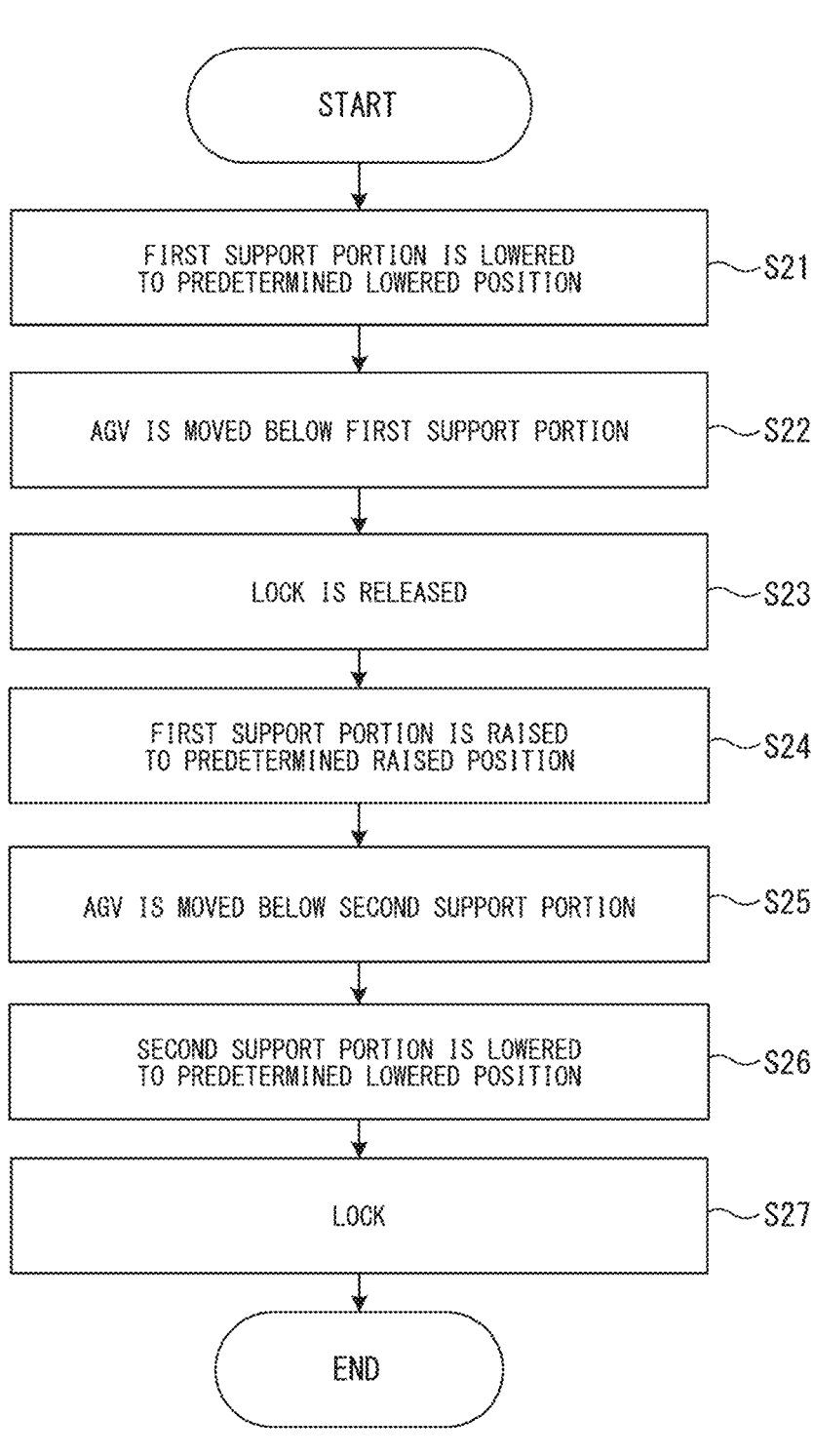
FIG. 3 is a flowchart detailing an exchange operation of operation units.

FIG. 3 is a flowchart specifically detailing the exchange operation of the operation unit shown in step S7 of FIG. 2. FIGS. 4A to 4F are views detailing the exchange operation of FIG. 3. The exchange operation for exchanging operation units will be specifically described below with reference to FIGS. 3 to 4F.

As shown in FIG. 4A, in step S21, the first elevator 41 is activated to preliminarily lower the first support portion 21 from the raised position to a predetermined lowered position. Then, in step S22, the automatic guided vehicle 5 to which the operation unit A1 is attached returns to the operation unit exchange station 19 (corresponding to step S6 of FIG. 2).

As described above, the slit 21*a* is formed in the first support portion 21. Thus, as can be understood from FIG. 4B, the automatic guided vehicle 5 passes through the entrance of the slit 21*a* located on the front side of the operation unit exchange station 19 and moves to the back side of the slit 21*a*. This causes the automatic guided vehicle 5 to move to a position corresponding to the first support portion 21.

Then, in step S23, the lock between the first operation unit affixation part 31 and the automatic guided vehicle 5 is released. In step S24, the first support portion 21 is raised from the lowered position to the raised position. As described above, the width of the slit 21*a* of the first support portion 21 is less than the width of the first operation unit affixation part 31 but greater than the width of the top part of the automatic guided vehicle 5. Thus, if the first support portion 21 engages with the first operation unit affixation part 31 while the first support portion 21 is raised, the first operation unit affixation part 31 detaches from the automatic guided vehicle 5 and is raised together with the first support portion 21 to the raised position (refer to FIG. 4C).

Figure 4D:
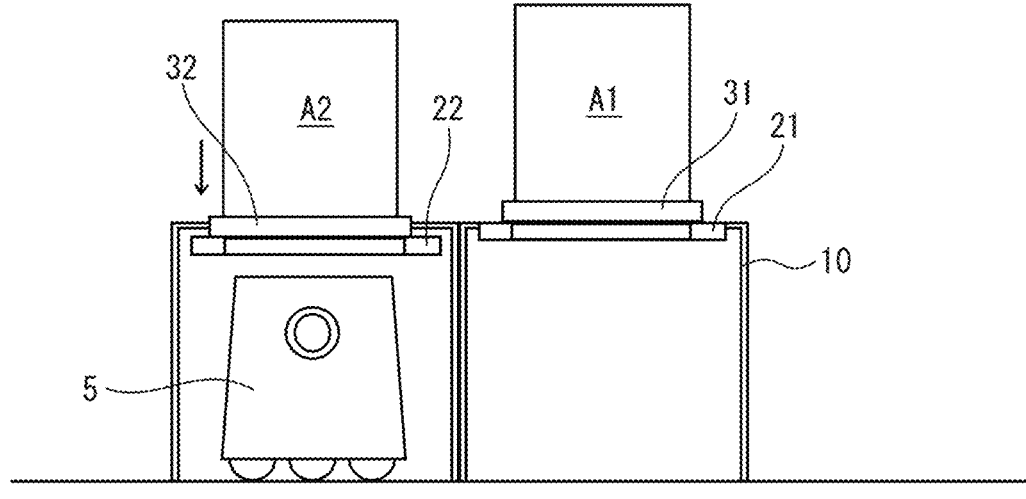
FIG. 4D is a fourth view detailing the exchange operation of FIG. 3.
Figure 4E:
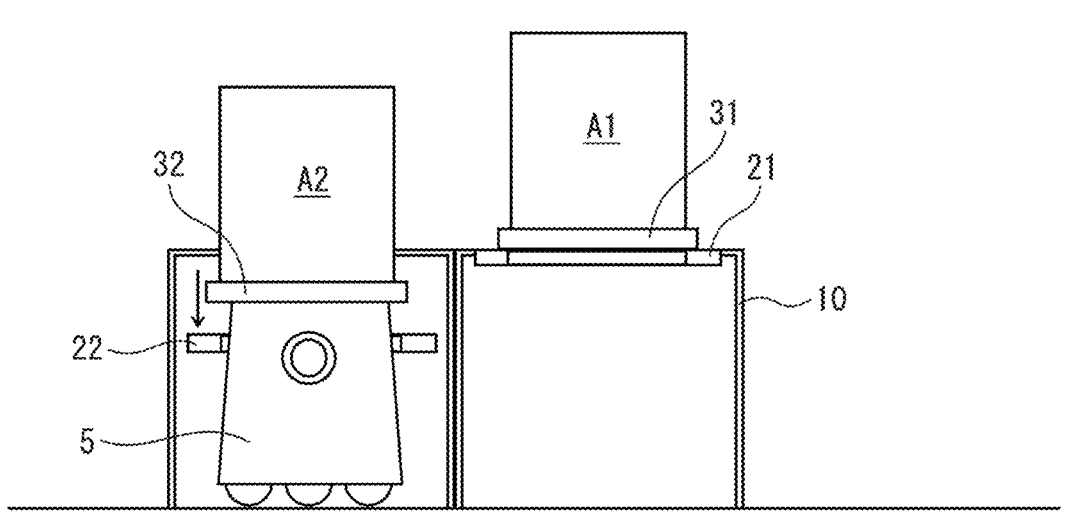
FIG. 4E is a fifth view detailing the exchange operation of FIG. 3.
Figure 4F:
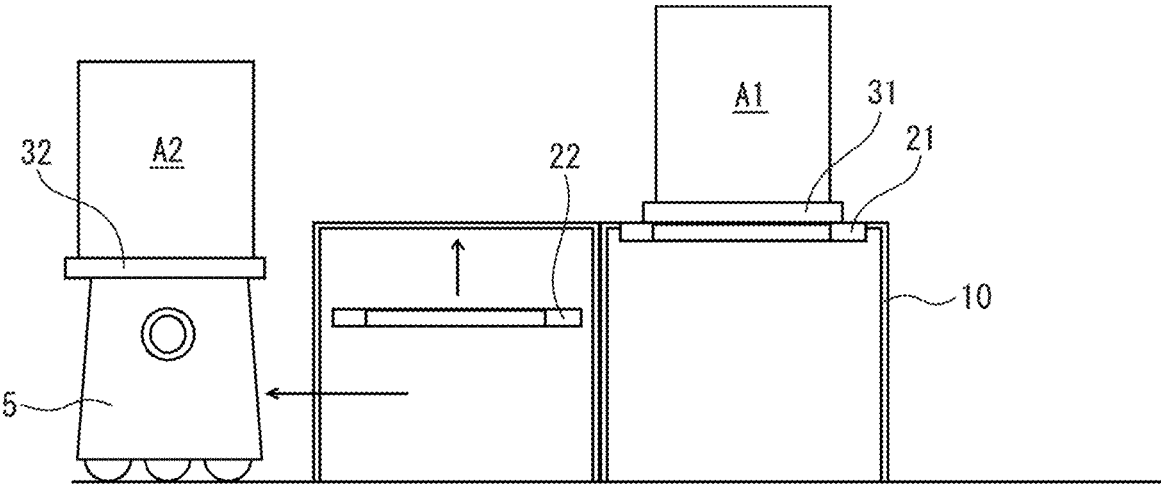
FIG. 4F is a sixth view detailing the exchange operation of FIG. 3.

Then, in step S25, the automatic guided vehicle 5 moves from below the first support portion 21 to below the second support portion 22 (refer to FIG. 4D). It is preferable that the automatic guided vehicle 5 simply move in the side-by-side direction of the first support portion 21 and the second support portion 22. Alternatively, the automatic guided vehicle 5 may exit the operation unit exchange station 19 once and enter from the outside to a position corresponding to the second support portion 22.

In step S26, the second support portion 22 supporting the second operation unit affixation part 32 is lowered to the predetermined lowered position. As described above, the width of the slit 22*a* of the second support portion 22 is greater than the width of the automatic guided vehicle 5 and less than the width of the second operation unit affixation part 32. Thus, if the top part of the automatic guided vehicle 5 engages with the second operation unit affixation part 32 while the second support portion 22 is being lowered, the second operation unit affixation part 32 is pushed by the top part of the automatic guided vehicle 5 and separates from the second support portion 22. As a result, only the second support portion 22 is lowered to the lowered position (refer to FIG. 4E).

Finally, in step S27, the locking mechanism engages the second operation unit affixation part 32 and the automatic guided vehicle 5. As a result, the automatic guided vehicle 5 can travel along the second route (refer to FIG. 4F).

It will be understood that the exchange from the second operation unit A2 to the first operation unit A1 is substantially identical. Furthermore, the attachment operation of the first operation unit in step S2 in FIG. 2 generally corresponds to steps S25 to S27 of FIG. 3.

Thus, in the present disclosure, the exchange of operation units A1 and A2 can be automatically performed. Specifically, in the present disclosure, it is not necessary to request the manufacturer to exchange the operation units provided in the automatic guided vehicle 5, whereby easy and quick exchange is possible. Furthermore, since there is no need to prepare a plurality of automatic guided vehicles 5 with separate operation units, budgets can be kept low, and the need to secure a space for storing a plurality of automatic guided vehicles 5 can be eliminated.

Figure 5:
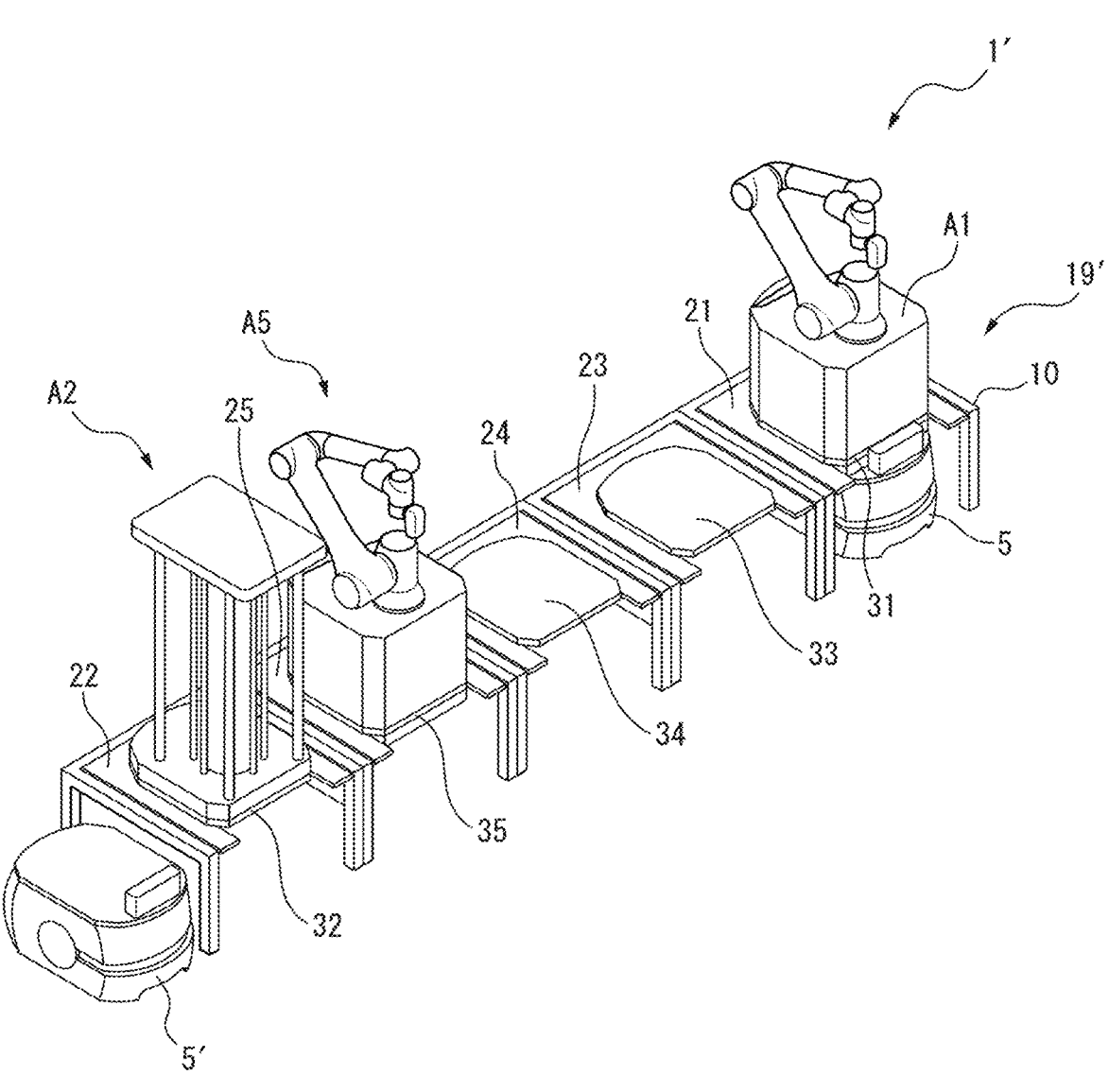
FIG. 5 is a perspective view of an operation unit exchange system based on a second embodiment.

FIG. 5 is a perspective view of the operation unit exchange system based on a second embodiment. The support part 10 of the operation unit exchange station 19' shown in FIG. 5 supports three or more, for example, five support portions 21 to 25 so as to be capable of individually raising and lowering them. These support portions 21 to 25 support operation unit affixation parts 31 to 35, respectively.

In FIG. 5, the operation unit A1, as a collaborative robot, is affixed to the operation unit affixation part 31, and the operation unit A2, as an ultraviolet irradiation device, is affixed to the second operation unit affixation part 32. Another collaborative robot, as operation unit A5, is affixed to the operation unit affixation part 35. Though not illustrated in the drawings, one of the operation units described above is affixed to each of operation unit affixation parts 33, 34.

In such a configuration, the operation unit A1 attached to the automatic guided vehicle 5 can be exchanged with an operation unit different from the operation unit A2, for example, the operation unit A3. It should be understood that the exchange of operation units is the same as described using FIG. 3. In FIG. 5, exchange between many types of operation units is possible. As a result, it can be understood that the expandability of the operation unit exchange system 1' of FIG. 5 can be enhanced.

Another automatic guided vehicle 5' is shown in FIG. 5. A plurality of automatic guided vehicles 5, 5' may use a common operation unit exchange station 19' in this manner. In this case, it is not necessary to prepare a separate operation unit exchange station 19' for each automatic guided vehicle 5, 5', whereby low cost can be achieved.

In FIG. 5, three or more support portions 21 to 25 are arranged in a row. However, in an unillustrated embodiment, these support portions may be arranged in a plurality of rows. Alternatively, a plurality of support portions may be arranged in a ring, and such cases remain within the scope of the present disclosure.

Figure 6:
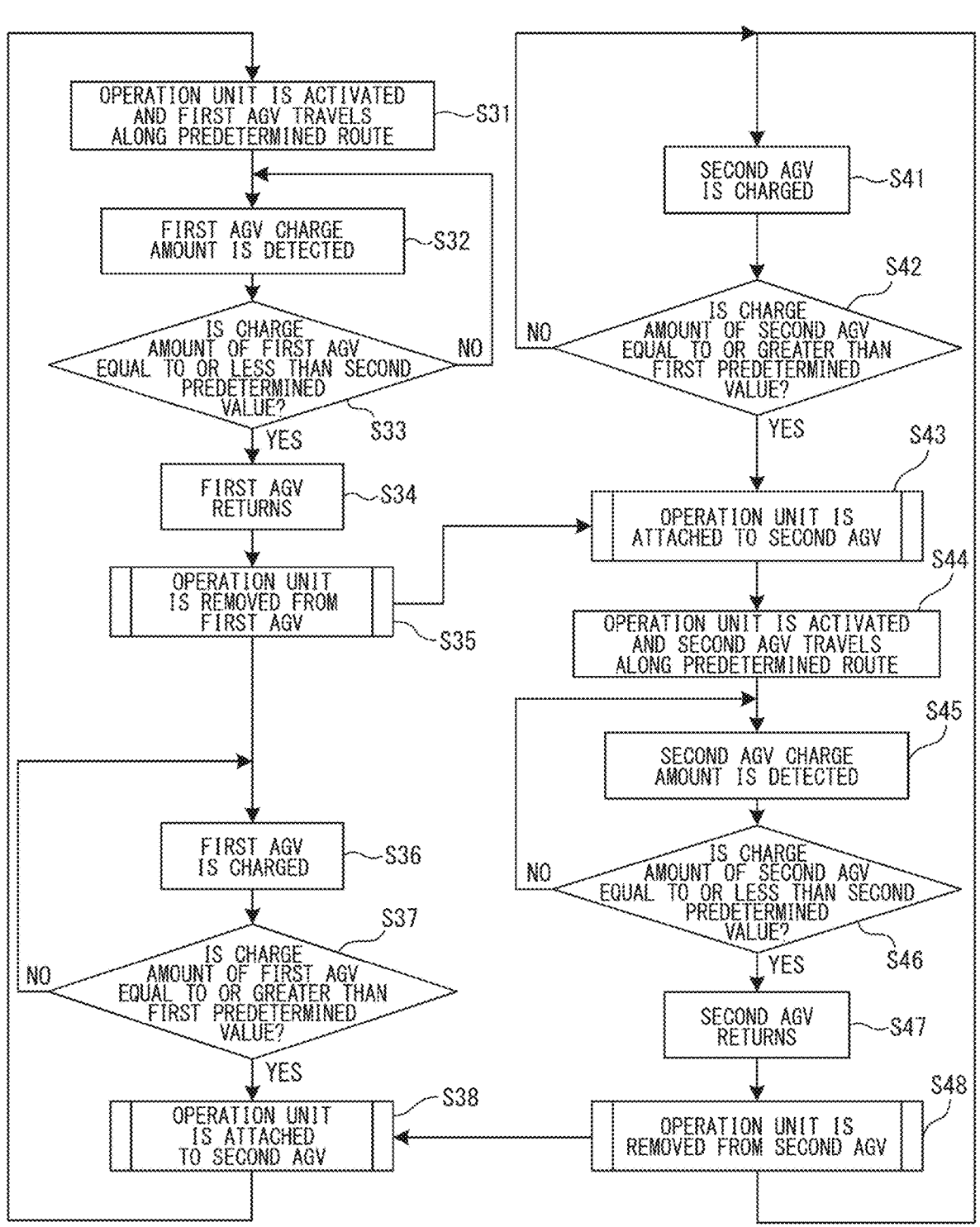
FIG. 6 is a flowchart detailing other operations of the operation unit exchange system.

The operation unit exchange system 1 can also perform other operations different from those described above, such as an operation in which a single operation unit A1 is exchanged between a plurality of automatic guided vehicles. Below, the automatic guided vehicle 5 will be referred to as a first automatic guided vehicle 5A, and the other automatic guided vehicle 5' will be referred to as a second automatic guided vehicle 5B. FIG. 6 is a flowchart detailing another operation of the operation unit exchange system. The contents of FIG. 6 and the routes of the automatic guided vehicles 5A, 5B are stored in the memories of the computers provided in the automatic guided vehicles 5A, 5B. The first automatic guided vehicle 5A and the second automatic guided vehicle 5B are of the same type, and are preferably the same as the automatic guided vehicles 5 and 5A.

In step S31 of FIG. 6, the operation unit A1 attached to the first automatic guided vehicle 5A is activated, and the first automatic guided vehicle 5A travels along a predetermined route. At this time, the charge amount of the rechargeable battery of the first automatic guided vehicle 5A is greater than or equal to a first predetermined value. For example, if the operation unit A1 is an ultraviolet irradiation device, the first automatic guided vehicle 5A travels while emitting ultraviolet rays from the ultraviolet irradiation device.

Then, in step S32, the charge amount of the rechargeable battery of the first automatic guided vehicle 5A is detected. If the charge amount is less than a second predetermined value, it is determined that the charge amount is insufficient, and the first automatic guided vehicle 5A returns to the operation unit exchange station 19 (steps S33 and S34).

In step S35, the operation unit A1 is removed from the first automatic guided vehicle 5A. The operation of removing the operation unit A1 from the first automatic guided vehicle 5A will be described later. The rechargeable battery of the first automatic guided vehicle 5A is then charged until the charge amount of the rechargeable battery becomes equal to or greater than the first predetermined value (steps S37 and S38). Note that the first predetermined value as a charge amount is greater than the second predetermined value described above.

The operation unit A1 removed from the first automatic guided vehicle 5A is attached to the second automatic guided vehicle 5B in step S43. The charge amount of the rechargeable battery of the second automatic guided vehicle 5B is equal to or greater than the first predetermined value at the time of step S43 and is sufficiently charged. The attachment of the operation unit A1 to the second automatic guided vehicle 5B will be described later.

Then, in step S44, the operation unit A1, for example, the ultraviolet irradiation device, is activated, and the second automatic guided vehicle 5B travels along a predetermined route. The predetermined route of the second automatic guided vehicle 5B may be different from the predetermined route of the first automatic guided vehicle 5A.

Then, in step S45, the charge amount of the rechargeable battery of the second automatic guided vehicle 5B is detected. If the charge amount is less than the second predetermined value, it is determined that the charge amount is insufficient, and the second automatic guided vehicle 5B returns to the operation unit exchange station 19 (steps S46 and S47).

In step S48, the operation unit A1 is removed from the second automatic guided vehicle 5B. The operation unit A1 removed from the second automatic guided vehicle 5B is attached to the first automatic guided vehicle 5A in step S38. The rechargeable battery of the first automatic guided vehicle 5A at this time has already been charged to the first predetermined value or more. The operation of removing and attaching the operation unit A1 will be described later. The rechargeable battery of the second automatic guided vehicle 5B is then charged until the charge amount of the rechargeable battery becomes equal to or greater than the first predetermined value (steps S41 and S42).

FIG. 7 is a flowchart specifically detailing the exchange operation of an automatic guided vehicle. 8A to 8F are diagrams for explaining the exchange operation of FIG. 7. The exchange operation for exchanging between automatic guided vehicles will be specifically described below with reference to FIGS. 7 to 8F. Note that in this example, a single operation unit A1 and its associated members, such as the first operation unit affixation part 31, the first support portion 21, etc., are used, and the second support portion 22 is not used. For the sake of clarity, the first elevator 41 and the second elevator 42 mentioned above are not illustrated in FIGS. 8A to 8F. Further, duplicate explanation of matters which have already been described with reference to FIG. 3 may be partially omitted.

Figure 8A:
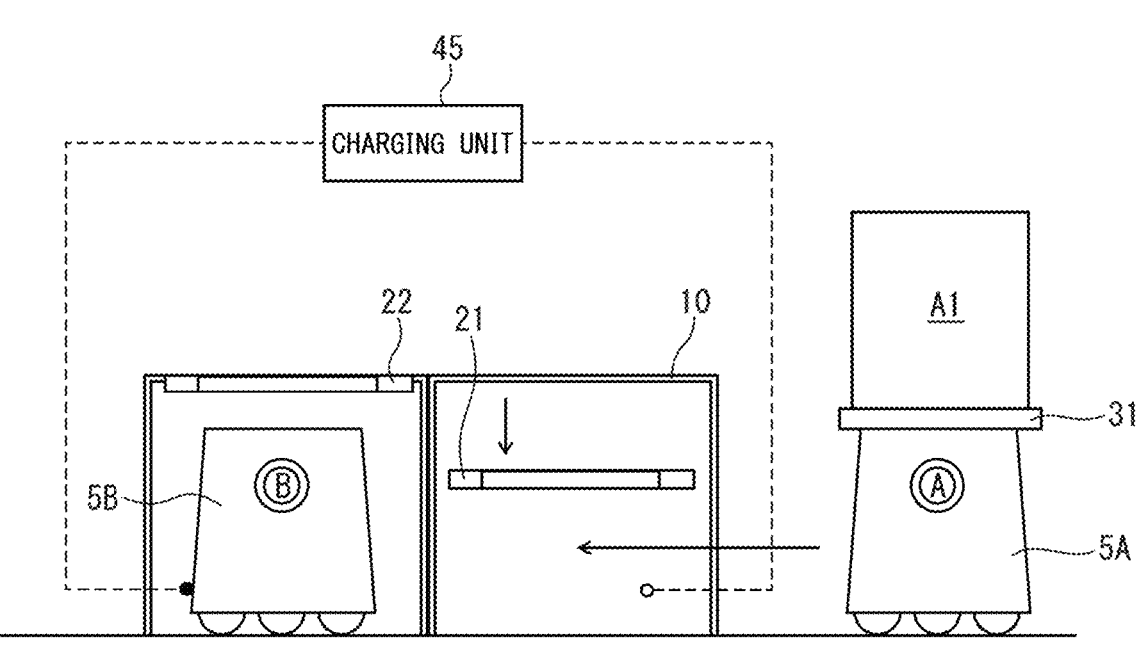
FIG. 8A is a first view detailing the exchange operation of FIG. 7.

As shown in FIG. 8A, in step S51, the first elevator 41 is activated, and the first support portion 21 is lowered in advance from a raised position to a predetermined lowered position. Then, in step S52, the first automatic guided vehicle 5A to which the operation unit A1 is attached returns to the operation unit exchange station 19 and moves below the first support portion 21 (corresponding to step S34 in FIG. 6).

Figure 8B:
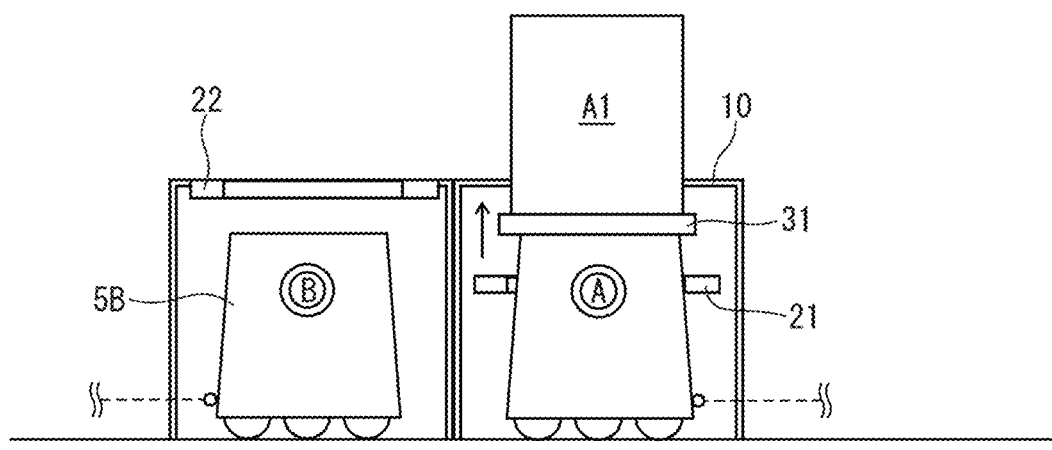
FIG. 8B is a second view detailing the exchange operation of FIG. 7.
Figure 8C:
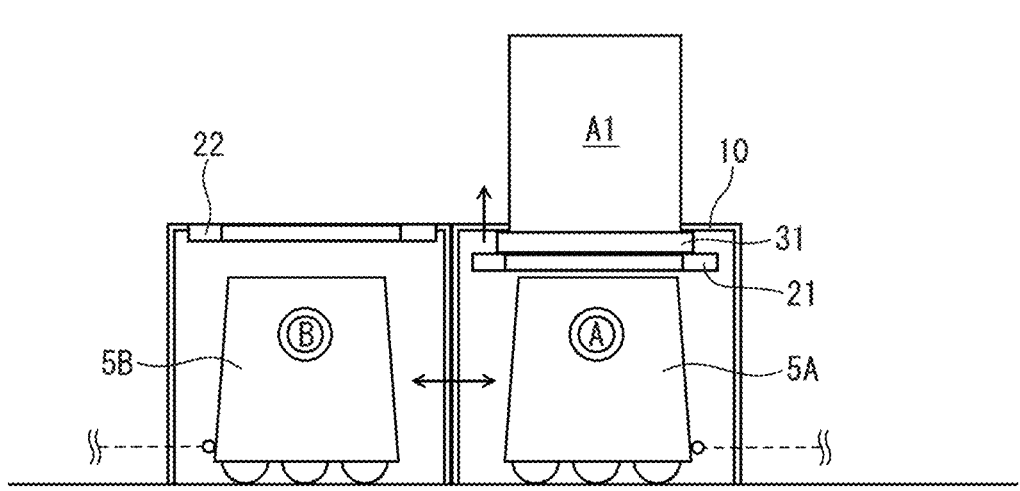
FIG. 8C is a third view detailing the exchange operation of FIG. 7.

The second automatic guided vehicle 5B shown in FIG. 8B is already waiting at a position corresponding to the second support portion 22 or another position in the operation unit exchange station 19. In this situation, the rechargeable battery of the second automatic guided vehicle 5B is preferably charged in advance by the charging unit 45 to the first predetermined value or higher. When the circle indicated by the tip of the broken line extending from the charging unit 45 is black, it indicates that the corresponding automatic guided vehicle is being charged. A white circle indicates that charging is not being performed.

Then, in step S53, the lock between the first operation unit affixation part 31 and the first automatic guided vehicle 5A is released. In step S54, the first support portion 21 is raised from the lowered position to the raised position (FIG. 8B). Thus, the first operation unit affixation part 31 leaves the first automatic guided vehicle 5A and rises together with the first support portion 21 to the raised position (refer to FIG. 8C). As a result, the operation unit A1 is removed from the first automatic guided vehicle 5A (steps S51 to S54 of FIG. 7 correspond to step S35 of FIG. 6).

Figure 8D:
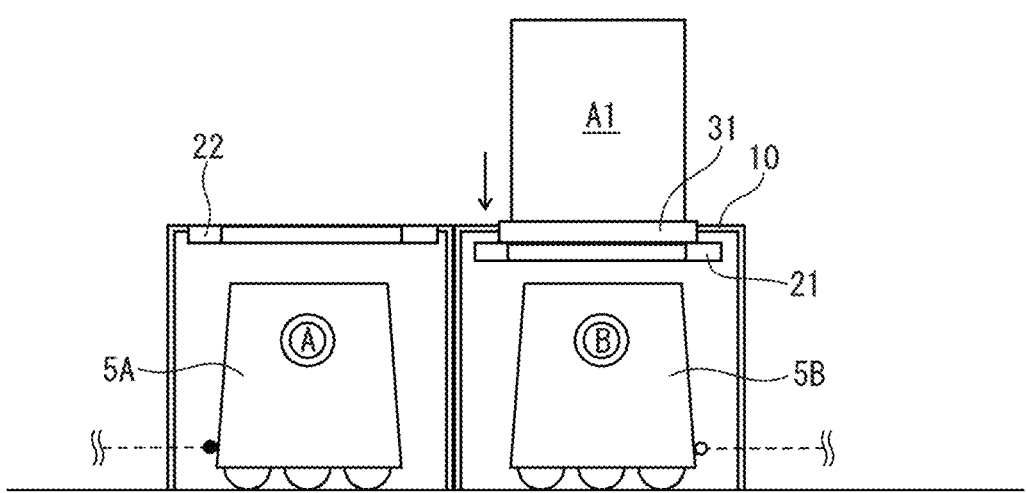
FIG. 8D is a fourth view detailing the exchange operation of FIG. 7.
Figure 8E:
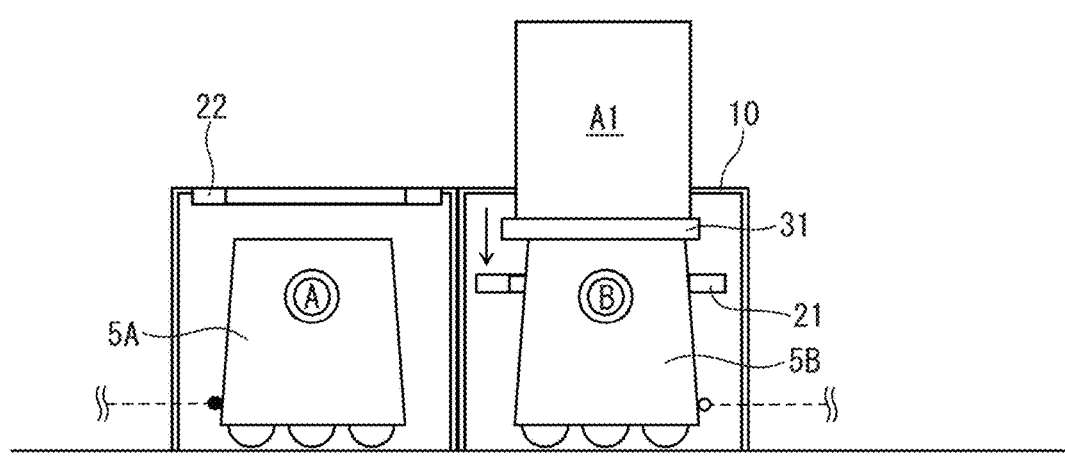
FIG. 8E is a fifth view detailing the exchange operation of FIG. 7.
Figure 8F:
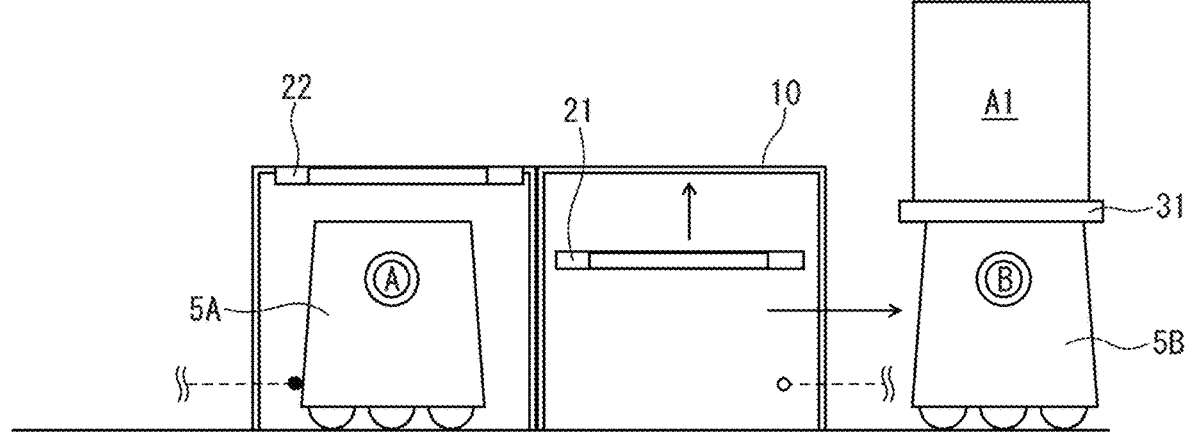
FIG. 8F is a sixth view detailing the exchange operation of FIG. 7.

Then, in step S55, the first automatic guided vehicle 5A exits from below the first support portion 21, and the second automatic guided vehicle 5B moves below the first support portion 21. The positions of the first automatic guided vehicle 5A and the second automatic guided vehicle 5B may be exchanged with each other, as shown in FIG. 8D.

Then, in step S56, the first support portion 21 supporting the first operation unit affixation part 31 is lowered to a predetermined lowered position. If the top part of the second automatic guided vehicle 5B engages with the first operation unit affixation part 31 while the first support portion 21 is being lowered, the first operation unit affixation part 31 is pushed by the top part of the second automatic guided vehicle 5B and separates from the first support portion 21. As a result, only the first support portion 21 descends to the lowered position (refer to FIG. 8E).

Then, in steps S57 and S58, the first operation unit affixation part 31 and the second automatic guided vehicle 5B are engaged by the locking mechanism, whereby the operation unit A1 is attached to the second automatic guided vehicle 5B (steps S55 to S58 of FIG. 7 correspond to step S43 of FIG. 6). As a result, the second automatic guided vehicle 5B can travel along the predetermined route (refer to FIG. 8F). Since the operation of removing the operation unit A1 from the second automatic guided vehicle 5B (corresponding to step S48 of FIG. 6) and the attachment operation of attaching the operation unit A1 to the first automatic guided vehicle 5A (step S38 of FIG. 6), are the same as described above, descriptions thereof have been omitted.

In the present invention, the operation of removing the operation unit A1 from one automatic guided vehicle, such as the first automatic guided vehicle 5A, and the operation of attaching the operation unit A1 to the other automatic guided vehicle, such as the second automatic guided vehicle 5B are continuously and automatically performed. Thus, the operation unit A1 is transferred from one automatic guided vehicle with an insufficient charge amount to the other fully charged automatic guided vehicle, whereby the operation unit A1 can continue to operate continuously over its own uptime, for example, 24 hours or more.

Conventionally, it takes several hours to charge the rechargeable battery of an automatic guided vehicle. However, in the present invention, since one automatic guided vehicle can be charged after the operation unit A1 is attached to another charged automatic guided vehicle, there is no need for the operation unit A1 to wait. In other words, the waiting time of operation unit A1 can be eliminated.

When the operation unit A1 is an ultraviolet irradiation device, the operation unit A1 is limited to, for example, use at night in an unmanned hospital. Even if the charge amount of the automatic guided vehicle 5A is insufficient in such an environment, the operation unit exchange system 1 allows the operation unit A1 to be transferred to another charged automatic guided vehicle 5B, whereby the operation unit A1 can be operated continuously without waiting time for charging. Thus, it is particularly advantageous when the operation unit A1 is an ultraviolet irradiation device. The same applies when the operation unit A1 is a sterilization unit or the like.

Thus, in the present invention, an operation unit can be automatically exchanged for another operation unit, and an automatic guided vehicle can be automatically exchanged for another automatic guided vehicle. Therefore, due to the operation unit exchange system 1, for example, in a hospital, an operation unit as a display can be used for guidance during the daytime, and an operation unit A1 as an ultraviolet irradiation device can be attached to another charged automatic guided vehicle 5 at night for sterilization. Specifically, due to the operation unit exchange system 1, the same operations can continuously be performed with a single operation unit beyond the operating time of the automatic guided vehicle 5, and different operations can sequentially be performed with different operation units.

Aspects of the Present Disclosure

According to a first aspect, there is provided an operation unit exchange system (1), comprising an automatic guided vehicle (5, 5'), a first operation unit (A1) and a second operation unit (A2), and an operation unit exchange station (19, 19') for removing the first operation unit attached to the automatic guided vehicle and attaching the second operation unit to the automatic guided vehicle.

According to a second aspect, in the first aspect, the operation unit exchange station comprises a first operation unit affixation part (31) to which the first operation unit (A1) is affixed, a second operation unit affixation (32) part to which the second operation unit (A2) is affixed, a first support portion (21) which partially supports the first operation unit affixation part, a second support portion (22) which partially supports the second operation unit affixation part, and a support part (10) which supports the first support portion and the second support portion so as to be capable of individually raising and lowering them, a slit (21a, 22a) is formed in each of the first support portion and the second support portion, widths of the slits are less than widths of the first operation unit affixation part and the second operation unit affixation part, the widths of the slits are greater than a width of the automatic guided vehicle, and a lower surface position of the support part is higher than a top part of the automatic guide vehicle.

According to a third aspect, in the second aspect, in a state in which the first support portion, which supports the first operation unit affixation part, is in a predetermined raised position, the automatic guided vehicle moves to a position in the support part corresponding to the first support portion, and the first support portion is lowered to a predetermined lowered position, and the first operation unit affixation part is attached to the automatic guided vehicle.

According to a fourth aspect, in the second third aspect, in a state in which the first support portion is lowered to a predetermined lowered position, the automatic guided vehicle to which the first operation unit affixation part is attached moves into the slit of the first support portion, and the first support portion is raised to a predetermined raised position and the first operation unit affixation part is removed from the automatic guided vehicle.

According to a fifth aspect, in the fourth aspect, the automatic guided vehicle from which the first operation unit affixation part is removed moves to a position in the support part corresponding to the second support portion, and the second support portion is lowered to a predetermined lowered position, and the second operation unit affixation part is attached to the automatic guided vehicle.

According to a sixth aspect, in any of the first to fifth aspects, at a first predetermined time, the automatic guided vehicle to which the first operation unit affixation part is attached returns to the operation unit exchange station, the operation unit exchange station removes the first operation unit affixation part from the automatic guided vehicle and attaches the second operation unit affixation part to the automatic guided vehicle, and at a second predetermined time after the first predetermined time, the automatic guided vehicle to which the second operation unit affixation part is attached begins to travel.

According to a seventh aspect, there is provided an operation unit exchange station (19, 19'), comprising a first operation unit affixation part (31) to which a first operation unit (A1) is to be affixed, a second operation unit affixation part (32) to which a second operation unit is to be affixed (A2), a first support portion (21) which partially supports the first operation unit affixation part, a second support portion (22) which partially supports the second operation unit affixation part, and a support part (10) which supports the first support portion and the second support portion so as to be capable of individually raising and lowering them, wherein a slit (21a, 22a) is formed in each of the first support portion and the second support portion, widths of the slits are less than widths of the first operation unit affixation part and the second operation unit affixation part, the widths of the slits are greater than a width of an automatic guided vehicle to which one of the first operation unit affixation part and the second operation unit affixation part is to be attached, and a lower surface position of the support part is higher than a top part of the automatic guide vehicle.

According to an eighth aspect, there is provided an operation unit exchange system (1), comprising a first automatic guided vehicle (5A) and a second automatic guided vehicle (5B), an operation unit (A1), and an operation unit exchange station (19, 19') for removing the operation unit, which is attached to the first automatic guided vehicle, and attaching it to the second automatic guided vehicle.

According to a ninth aspect, in the eighth aspect, the operation unit exchange station comprises an operation unit affixation part (31) to which the operation unit is affixed, a support portion (21) which partially supports the operation unit affixation part, and a support part (10) for supporting the support portion so as to be capable of raising and lowering it, wherein a slit (21a) is formed in the support portion, a width of the slit is less than a width of the operation unit affixation part, the width of the slit is greater than the widths of the first automatic guided vehicle and the second automatic guided vehicle, and a lower surface position of the support part is higher than a top part of the first automatic guided vehicle and a top part of the second automatic guided vehicle.

According to a tenth aspect, in the ninth aspect, in a state in which the support portion is lowered to a predetermined lowered position, the first automatic guided vehicle to which the operation unit affixation part is attached moves into the slit of the support portion, the support portion is raised to a predetermined raised position and the operation unit affixation part is removed from the first automatic guided vehicle, the first automatic guided vehicle exits from the slit of the support portion and the second automatic guided vehicle moves into the slit of the support portion, and the support portion is lowered to a predetermined lowered position and the operation unit affixation part is attached to the second automatic guided vehicle.

According to an eleventh aspect, in the tenth aspect, a charge amount of the second automatic guided vehicle is greater than a first predetermined value, and a charge amount of the first automatic guided vehicle is less than a second predetermined value, which is less than the first predetermined value.

Though the embodiments of the present invention have been described above, a person skilled in the art would understand that various modifications and changes can be made without deviating from the scope disclosed in the claims, which are described later.

REFERENCE SIGNS LIST

1, 1' operation unit exchange system
5, 5', 5A, 5B automatic guided vehicle
5a control panel
10 support part
18 leg part
19, 19' operation unit exchange station
21 first support portion
21a slit
22 second support portion
22a slit
23 to 25 support portion
31 first operation unit affixation part
32 second operation unit affixation part
32 to 35 operation unit affixation part
41 first elevator
42 second elevator
45 charging unit
A1 to A5 operation unit

The invention claimed is:

1. An operation unit exchange system, comprising:
an automatic guided vehicle,
a first operation unit and a second operation unit, and
an operation unit exchange station for removing the first operation unit attached to the automatic guided vehicle and attaching the second operation unit to the automatic guided vehicle,
wherein
the operation unit exchange station comprises:
a first operation unit affixation part to which the first operation unit is affixed,
a second operation unit affixation part to which the second operation unit is affixed, a first support portion which partially supports the first operation unit affixation part, a second support portion which partially supports the second operation unit affixation part, a support part which supports the first support portion and the second support portion, and a first elevator and a second elevator connected to the first support portion and the second support portion, respectively, to individually raise and lower the first support portion and the second support portion, the first support portion and the second support portion are arranged side-by-side at locations corresponding to a top plate of the support part, a slit is formed in each of the first support portion and the second support portion, widths of the slits are less than widths of the first operation unit affixation part and the second operation unit affixation part, the widths of the slits are greater than a width of the automatic guided vehicle, and a lower surface position of the support part is higher than a top part of the automatic guide vehicle.

2. The operation unit exchange system according to claim 1, wherein in a state in which the first support portion, which supports the first operation unit affixation part, is in a predetermined raised position, the automatic guided vehicle moves to a position in the support part corresponding to the first support portion, and the first support portion is lowered by the first elevator to a predetermined lowered position, and the first operation unit affixation part is attached to the automatic guided vehicle.

3. The operation unit exchange system according to claim 1, wherein in a state in which the first support portion is lowered by the first elevator to a predetermined lowered position, the automatic guided vehicle to which the first operation unit affixation part is attached moves into the slit of the first support portion, and the first support portion is raised by the first elevator to a predetermined raised position and the first operation unit affixation part is removed from the automatic guided vehicle.

4. The operation unit exchange system according to claim 3, wherein the automatic guided vehicle from which the first operation unit affixation part is removed is configured to move to a position in the support part corresponding to the second support portion, and the second support portion is configured to be lowered by the second elevator to a predetermined lowered position, and the second operation unit affixation part is configured to be attached to the automatic guided vehicle.

5. The operation unit exchange system according to claim 1, wherein at a first predetermined time, the automatic guided vehicle to which the first operation unit affixation part is attached is configured to return to the operation unit exchange station, the operation unit exchange station is configured to remove the first operation unit affixation part from the automatic guided vehicle and attach the second operation unit affixation part to the automatic guided vehicle, and at a second predetermined time after the first predetermined time, the automatic guided vehicle to which the second operation unit affixation part is attached is configured to begin to travel.

6. An operation unit exchange station, comprising:

a first operation unit affixation part to which a first operation unit is to be affixed, a second operation unit affixation part to which a second operation unit is to be affixed, a first support portion which partially supports the first operation unit affixation part, a second support portion which partially supports the second operation unit affixation part, wherein the first support portion and the second support portion are arranged side-by-side at locations corresponding to a top plate of the support part, a support part which supports the first support portion and the second support portion, and a first elevator and a second elevator connected to the first support portion and the second support portion, respectively, to individually raise and lower the first support portion and the second support portion, wherein a slit is formed in each of the first support portion and the second support portion, widths of the slits are less than widths of the first operation unit affixation part and the second operation unit affixation part, the widths of the slits are greater than a width of an automatic guided vehicle to which one of the first operation unit affixation part and the second operation unit affixation part is to be attached, and a lower surface position of the support part is higher than a top part of the automatic guide vehicle.

\* \* \* \* \*